United States Patent [19]
Wilson, Sr. et al.

[11] Patent Number: 5,740,875
[45] Date of Patent: Apr. 21, 1998

[54] TRACKED VEHICLE DRIVE SYSTEM

[75] Inventors: John M. Wilson, Sr.; Dean R. Wilson, both of Marrero, La.

[73] Assignee: Wilco Marsh Buggies & Draglines, Inc., La.

[21] Appl. No.: 588,875

[22] Filed: Jan. 19, 1996

[51] Int. Cl.[6] ............................................. B62D 55/12
[52] U.S. Cl. ........................ 180/9.62; 180/6.48; 180/308; 114/61
[58] Field of Search ............................ 180/9.1, 9.62, 180/305, 307, 308, 6.48, 6.7; 114/61, 270; 305/107

[56] References Cited

U.S. PATENT DOCUMENTS

| | | | |
|---|---|---|---|
| 851,517 | 4/1907 | Hildebrand | 440/42 |
| 1,192,423 | 7/1916 | Henneuse | 180/9.62 |
| 1,318,008 | 10/1919 | Johnson | 305/101 |
| 3,645,351 | 2/1972 | Deli et al. | 180/9.2 R |
| 3,674,105 | 7/1972 | Egli | 180/9.48 |
| 3,807,521 | 4/1974 | Sargent | 180/6.48 |
| 3,853,193 | 12/1974 | Dunn | 180/6.48 |
| 3,872,939 | 3/1975 | Eckert | 180/6.48 |
| 3,893,531 | 7/1975 | Gee | 180/6.48 |
| 4,124,124 | 11/1978 | Rivet | 212/69 |
| 4,262,764 | 4/1981 | Kraus | 180/9.48 |
| 4,431,073 | 2/1984 | Nagao et al. | 180/308 X |
| 4,433,634 | 2/1984 | Coast | 114/270 |
| 4,537,268 | 8/1985 | Fukushima et al. | 180/9.1 |
| 4,817,554 | 4/1989 | Prestenbach | 114/270 |
| 4,846,092 | 7/1989 | Wilson | 114/270 |
| 5,379,709 | 1/1995 | Wilkerson | 114/61 |

*Primary Examiner*—Kevin Hurley
*Attorney, Agent, or Firm*—Conley, Rose & Tayon, P.C.

[57] ABSTRACT

An efficient direct drive system is featured which is easier to maintain than conventional systems. The system includes a drive assembly which employs a hydraulic motor to rotate a shaft assembly and power most or all of the drive chains of the vehicle's endless track assembly at once. A laterally located motor directly rotates the shaft assembly. A gear assembly is included in the drive system. A brake assembly may be included in the system. The shaft assembly is made up of an inner shaft and an outer shaft sleeve which are disposed over portions of the inner shaft. Laterally outer drive sprockets are bolted or otherwise affixed to the outer shaft sleeve. The inner shaft and outer shaft sleeve are further keyed together so that the shaft assembly is rotatable as a unitary piece. The shaft assembly may be easily dismantled to change the laterally outer sprockets when necessary.

6 Claims, 4 Drawing Sheets

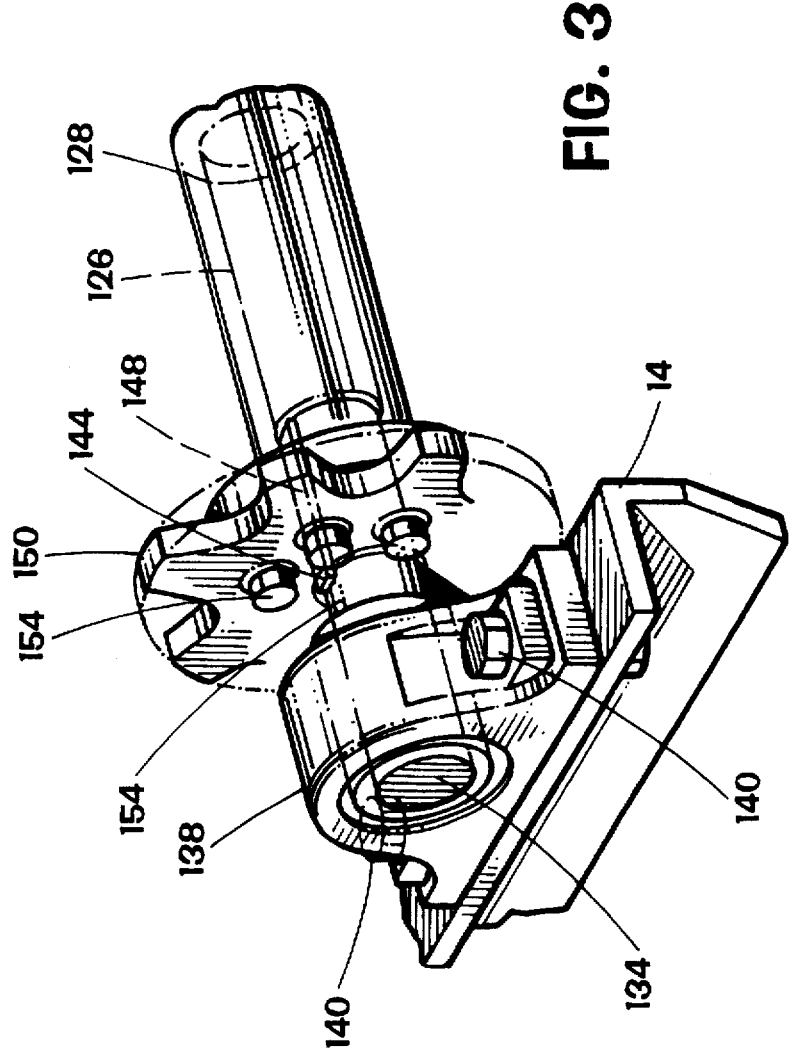

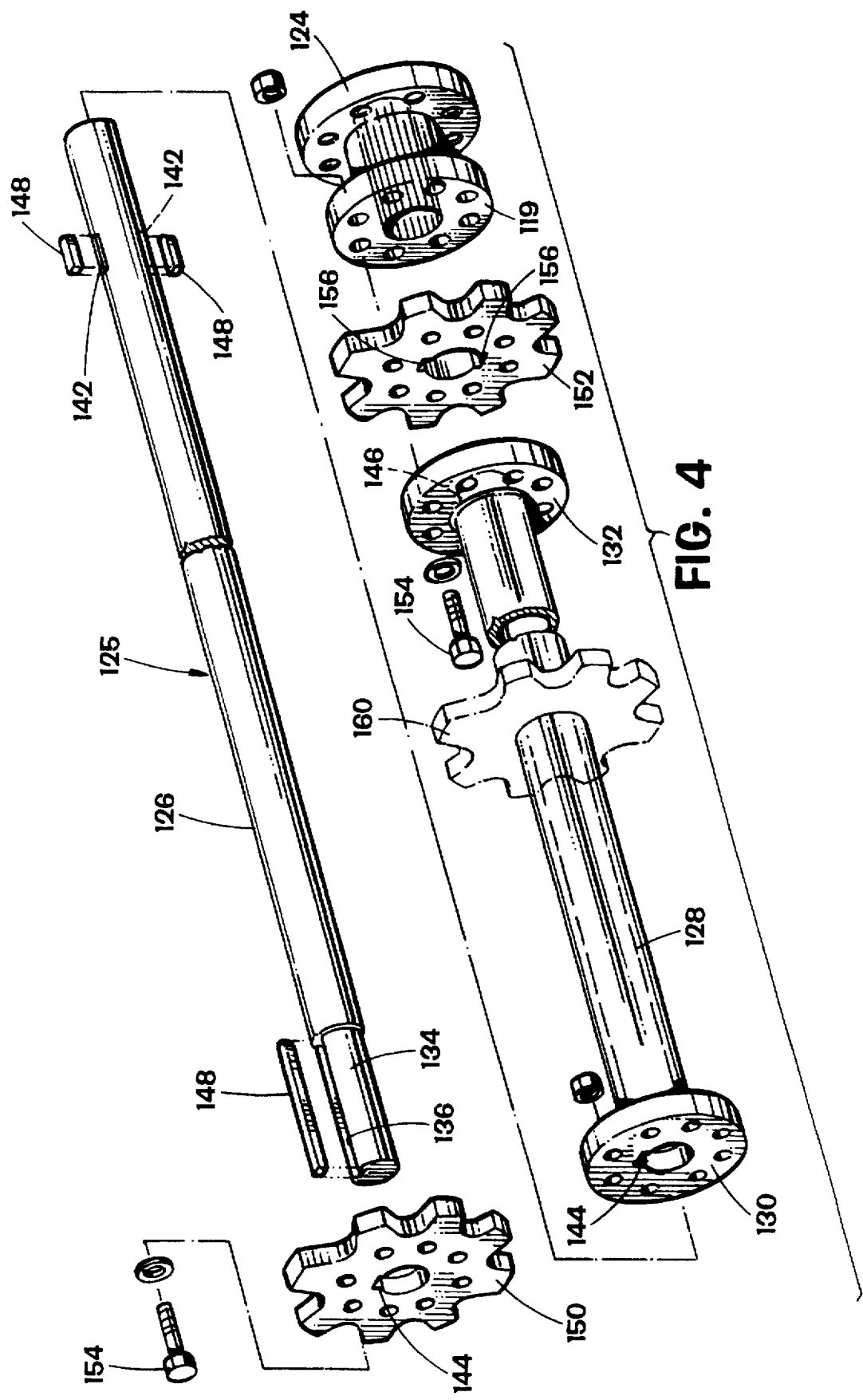

TRACKED VEHICLE DRIVE SYSTEM

BACKGROUND OF THE INVENTION

1. Field of the Invention

The invention relates to tracked vehicles. More particularly, the invention relates to methods and apparatus for operation of a chainless drive system useful in propelling tracked vehicles.

2. Description of Related Art

Tracked vehicles such as marsh buggies and other amphibian crawlers are typically driven by means of an endless track arrangement which surrounds a pontoon and is driven about the outer surface of the pontoon by means of a hydraulic motor. In most standard designs, the hydraulic motor is interengaged with the endless track by means of a chain drive which transfers the power generated by the hydraulic motor to a separate, independent track drive assembly which, in turn, drives one or more track chains to operate the endless drive. A typical marshbuggy has from two to five track chains which connect the cleats of the endless drive. An example of this sort of arrangement is shown in U.S. Pat. No. 4,124,124 issued to Rivet (e.g., FIG. 9 and col. 1, lines 63–65).

The use of chain drives has a number of disadvantages including the need for lubrication of the chain drive, and water pollution and hazards which result from open drive chains. When a drive chain breaks or becomes worn out, it is expensive to replace.

A few direct drive systems have been developed which eliminate the chain drive. Unfortunately, these systems suffer from other problems which may make them impractical. An example of such a system is that disclosed in U.S. Pat. No. 4,817,554, issued to Prestenbach. This system drives a single track chain which powers the endless track. Excessive wear develops on this single chain. The single track chain is located toward one end of the drive assembly rather than centrally, which enhances the chances of the vehicle jumping track.

Another direct drive system is disclosed in U.S. Pat. No. 3,807,521, issued to Sargent wherein two reversible hydraulic motors per pontoon are located on the front end underside of the vehicle body. The motors operate axle-mounted drive sprockets. However, when the vehicle's endless track assemblies are in place about the pontoon, the motors are difficult to gain access to because the track assemblies cover them. Thus, maintenance and repair of the hydraulic motors is difficult.

A related problem with conventional drive systems is that the sprockets which propel the track chains are typically fixedly secured to the drive shaft in a relatively permanent manner, such as by welding. If a sprocket is damaged during operation of the vehicle, it is difficult and time consuming to change the sprocket. In some instances, the entire shaft and sprocket assembly will need to be replaced.

It would be desirable, then, to develop a direct drive system which does not suffer from the disadvantages of the prior art.

SUMMARY OF THE INVENTION

The invention provides for an efficient direct drive system which is easier to maintain than conventional systems. The system includes a drive assembly which employs a hydraulic motor to rotate a shaft assembly and directly and evenly power most or all of the drive chains of the vehicle's endless track assembly at once. A laterally located motor directly rotates the shaft assembly. In the described embodiment, the power of the motor is transferred to the shaft assembly through an associated gear assembly which serves to reduce the speed of the motor's rotation and increase the torque placed upon the shaft assembly. A brake assembly may be included in the drive system which allows rotation of the shaft assembly to be slowed or stopped.

Construction of the shaft assembly permits laterally outer drive sprockets to be changed easily and with a minimum of effort. The shaft assembly is made up of an inner shaft and an outer shaft sleeve which are disposed over portions of the inner shaft. Laterally outer drive sprockets are bolted or otherwise fixedly attached to the outer shaft sleeve. The inner shaft and outer sleeve sections are further keyed together so that the shaft assembly is rotatable as a unitary piece. The shaft assembly may be easily dismantled to remove the laterally outer sprockets when necessary.

BRIEF DESCRIPTION OF THE DRAWINGS

FIG. 3 is a isometric detail view of an end portion of the exemplary drive assembly of FIG. 2.

FIG. 4 is an exploded view of an exemplary shaft assembly as used in the drive assembly of FIG. 2.

DETAILED DESCRIPTION OF THE PREFERRED EMBODIMENT

Figure 1:
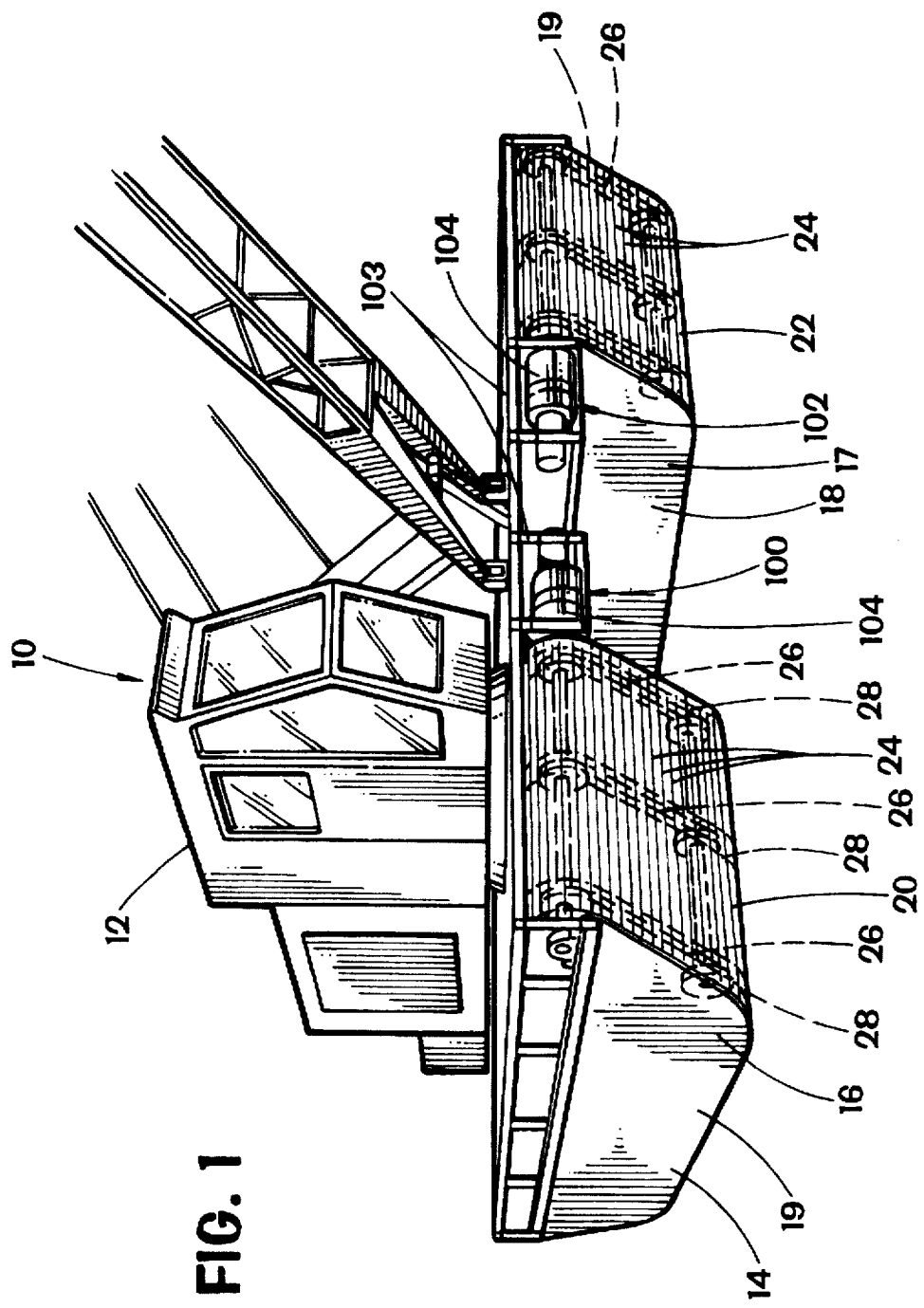
FIG. 1 shows an exemplary amphibious vehicle incorporating a drive system constructed in accordance with the present invention.

Referring first to FIG. 1, a tracked vehicle 10 is shown which includes an upper cab portion 12 and a lower chassis 14. The chassis 14 includes a pair of pontoons 16, 18 having inner sidewalls 17 and outer sidewalls 19 which generally define the width and lateral "footprint" of each pontoon 16, 18. Each pontoon 16, 18 carries an endless track 20, 22 which surrounds it. Each endless track 20, 22 includes a number of individual cleats 24 which are adapted to contact the ground or other surface and one or more chains 26 upon which the cleats 24 are mounted. An endless track assembly powers the vehicle by movement about a pontoon. The use of endless track assemblies to power and propel vehicles is well known. In the depicted exemplary vehicle 10, there are three sets of drive chains 26 per pontoon. The number of chains actually required will depend upon the size and usage of the vehicle. Smaller vehicles, such as those which must fit within a standard roadway lane width for transportation, such as via loadboy, typically only have two sets of chains, one proximate either lateral side of the pontoon. Larger swamp vehicles will have larger and wider pontoons and typically require a center set of chains. Portions of the surface of each of the pontoons 16, 18 include track chain guide channels 28 which help protect the pontoon against wear from abrasion by the track chains 26. Two exemplary drive assemblies 100, 102 are mounted on the vehicle 10 so as to be located beyond the inner sidewalls 17 of the pontoons 16, 18 as shown in FIG. 1. The lower portion 14 of the vehicle 10 includes a pair of protective cage-like structures 103 which help protect portions of the drive assemblies 100, 102.

Figure 2:
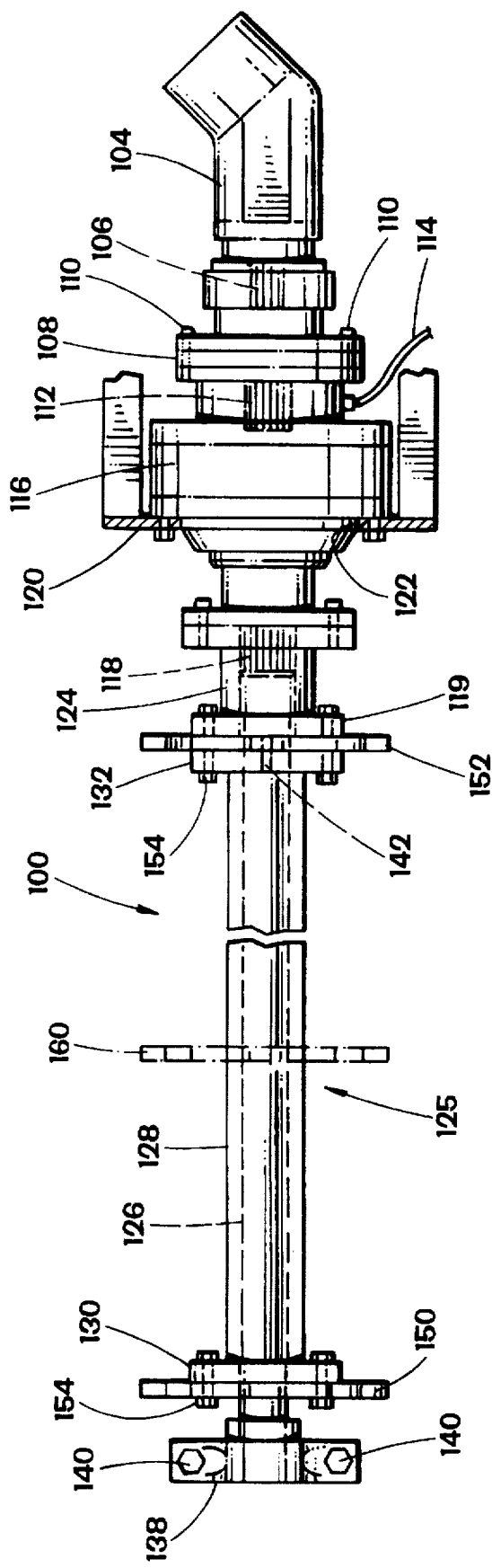
FIG. 2 is a plan view, partially in phantom, of an exemplary drive assembly constructed in accordance with the present invention.

Exemplary drive assembly 100 may be seen in detail in FIGS. 2–4. It should be understood that the drive assembly 102 will essentially mirror that described for assembly 100.

Where components of relatively well known design are employed, their structure and operation will not be described in great detail. Connections between components, although not specifically described in all instances, comprise conventional connection techniques such as threading and the use of elastomeric O-ring or other seals for fluid tightness where appropriate. Hydraulic motor 104 is shown which, when energized, rotates a splined motor shaft 106. Operation and control of a hydraulic motor of this type within a tracked vehicle by hydraulic pumps and a gasoline or diesel powered engine is well known in the art. See, e.g. U.S. Pat. No. 4,124,124, issued to Rivet. As the operation and control of the motor 104 are not significant features of this invention, however, they will not be described further here.

A brake assembly 108 is affixed to the motor 104 by fasteners 110, which are typically bolts. However, welding or other conventional fastening means may be used. The brake assembly 108 receives the splined motor shaft 106 within a complimentary splined recess (not shown). Rotation of the splined motor shaft 106 will cause, except under braking conditions, rotation of a second splined shaft 112 which extends from the brake assembly 108. Control of the brake assembly 108 is provided by a control cable or other conventional control means, illustrated at 114.

A gear box 116 is interengaged with the second splined shaft 112 such that a third splined shaft 118, which extends from the gear box 116, will be rotated thereby. The gear box 116 serves to reduce the rotational speed provided by the motor 104 to the third splined shaft 118 and transmit increased torque to the third splined shaft 118. The gear box 116 should permit a reduction in speed of shaft rotation on the order of 70/1 to 90/1. The gear box 116 replaces the multiple gear box arrangements typically employed in a conventional chain drive arrangement which is used to achieve a speed reduction of this nature. To achieve this type of reduction, the gear box 116 may be constructed of a number of layered gear reduction arrangements.

A stationary and secure mounting plate 120 is typically integrated with a side panel of the pontoon. The plate 120 includes an aperture 122 through which the portion of the gear box 116 containing the third splined shaft 118 extends when the gear box 114 is affixed to the plate 120 by bolting, welding or other secure and reliable means. A rotatable coupler 124 is splined onto the third splined shaft 118. The coupler 124 includes a ranged end 119.

The drive assembly 100 includes a composite shaft assembly 125 consisting of an inner shaft 126 which is preferably an elongated section of hardened steel such as 4140 steel or another durable material and an outer shaft sleeve 128 which presents radial flanges 130, 132 at either end. The shaft assembly 125 is shown in an exploded view in FIG. 4. Shaft assembly 125 is rotated with the third splined shaft 118.

The inner shaft 126 includes a reduced diameter end section 134 which has a longitudinal keyway 136 disposed along its length. The end section 134 extends into a pillow block 138 which is affixed to portions of the lower chassis 14 by bolts or other connectors 140. A pair of shorter keyways 142 are disposed proximate the end of the inner shaft 126 opposite the end section 134.

As best seen in FIG. 4, the outer shaft sleeve 128 includes keyways 144 and 146 which are generally complimentary to the keyways 136 and 142 in the inner shaft. Keys 148 are formed to fit into the aligned inner shaft keyways 136, 142 and outer shaft sleeve keyways 144, 146 to prevent rotation of the inner shaft 126 within the outer shaft sleeve 128.

Lateral drive sprockets 150, 152 are positioned along the inner shaft 126 and affixed to the shaft sleeve flanges 130, 132 by means of bolts or other connectors 154. Each of the sprockets 150, 152 includes a central aperture 154 having keyed portions 156, best seen in FIG. 4, which is shaped and sized to receive a key 148. The keying 156 of the aperture 154 is complimentary to that of the outwardly keyed portions 136, 142 of the inner shaft 126. Outer shaft sleeve 128 is slidably disposed over the inner shaft 126. The outer shaft sleeve 128 includes apertured flanges 130, 132 proximate either end through which connection bolts 154 may be disposed. When the drive assembly 100 is constructed as in FIG. 2, the connection bolts 154 securely affix the flanges 130, 132 of the outer sleeve section 128 to a sprocket 150, 152. The outer sleeve section 128 also serves to provide lateral support to the sprockets 150, 152 as well as to prevent the sprockets 150, 152 from movement along the inner shaft 126 out of alignment with the track chains 26 of the endless tracks 20, 22. The complimentary keying arrangement described previously interconnects each sprocket with the inner shaft 126 for rotation therewith. As a result, a composite shaft assembly 125 is formed which is rotatable as a unitary piece.

For vehicles, such as the exemplary marsh buggy depicted in FIGS. 1-4, a third, centrally located sprocket 160 is included which is generally welded or splined to the outer radial surface of the outer shaft sleeve 128.

If necessary or desired, the brake assembly 108 may be omitted and the motor 104 directly connected to the gear box 116 rather than the brake assembly 108.

In operation, the drive assembly 100 of the present invention provides for efficient operation of an endless track system and the tracked vehicle it is incorporated into. The drive system presents no exposed chain drive interconnecting the motor assembly with the sprocket shaft and therefore has a reduced need for lubrication and other maintenance. It is noted that the motor 104 is located generally laterally to and coaxially with the remaining portions of the drive assembly 100, thus eliminating the need for a chain drive arrangement to interconnect the motor and drive sprockets. Location of the motors 104 laterally outside of the pontoon and within the protective cage-like structures 103 allows easy access to the motors 104 for maintenance and repair. It is also noted that all of the endless drive chains 26 of the vehicle 10 are directly and evenly powered by the motor 104 via the shaft assembly 125.

In the event that a lateral sprocket 150 or 152 is damaged, it may be removed for replacement relatively easily. The pillow block 138 is first removed and the gear box 116 is removed from attachment with wall 120. Through removal of the necessary bolts 154. Either or both of the sprockets 160 and 152 may be replaced or repaired.

As those skilled in the art will recognize, the invention is subject to numerous modifications and alternative embodiments. It is noted that the invention has been described by reference to exemplary embodiments, but these are not to be construed as limiting it.

What is claimed is:
1. An amphibious tracked vehicle comprising:
  a. a pontoon surrounded by an endless track assembly;
  b. a drive assembly for driving the endless track assembly about the pontoon, the drive assembly comprising:
   1) a motor;
   2) a shaft assembly which is rotatable by the motor, the shaft assembly having an elongated inner shaft, an outer sleeve disposed along at least a portion of the inner shaft, and a sprocket, the shaft assembly being rotatable about its longitudinal axis as a unitary piece.

2. The vehicle of claim 1 wherein the inner shaft is affixed to the sprocket for rotation therewith by means of keying.

3. The vehicle of claim 2 wherein the sprocket is affixed to the outer sleeve such that the outer sleeve is rotated with the sprocket.

4. The vehicle of claim 1 further comprising a gear assembly operably interconnected between the motor and shaft assembly for transmission of torque therebetween.

5. The vehicle of claim 1 wherein the motor is located beyond the sidewalls of the pontoon.

6. An amphibious tracked vehicle comprising:

a. a pontoon surrounded by an endless track assembly;

b. a drive assembly for driving the endless track assembly about the pontoon, the drive assembly comprising:
 1) a motor;
 2) a shaft assembly which is rotatable about its longitudinal axis as a unitary piece by the motor, the shaft assembly comprising:
   a) an elongated inner shaft;
   b) an outer sleeve disposed along at least a portion of the inner shaft;
   c) a sprocket which is affixed to the inner shaft by keying;
   d) the sprocket further being affixed to the outer sleeve such that the outer sleeve is rotated with the sprocket.

* * * * *